No. 844,383. PATENTED FEB. 19, 1907.
C. R. MESTON & H. I. FINCH.
ELECTRIC MOTOR.
APPLICATION FILED APR. 11, 1906.

3 SHEETS—SHEET 3.

Witnesses
Edgar T. Farmer
A. J. McCauley

Inventors:
Charles R. Meston
Herbert I. Finch
by Bakewell Cornwall
Att'ys.

UNITED STATES PATENT OFFICE.

CHARLES R. MESTON AND HERBERT I. FINCH, OF ST. LOUIS, MISSOURI, ASSIGNORS TO THE EMERSON ELECTRIC MANUFACTURING COMPANY, OF ST. LOUIS, MISSOURI, A CORPORATION OF MISSOURI.

ELECTRIC MOTOR.

No. 844,383.     Specification of Letters Patent.     Patented Feb. 19, 1907.

Application filed April 11, 1906. Serial No. 311,187

*To all whom it may concern:*

Be it known that we, CHARLES R. MESTON and HERBERT I. FINCH, citizens of the United States, residing at St. Louis, Missouri, have jointly invented a certain new and useful Improvement in Electric Motors, of which the following is a full, clear, and exact description, such as will enable others skilled in the art to which it appertains to make and use the same, reference being had to the accompanying drawings, forming part of this specification, in which—

Figure 1:
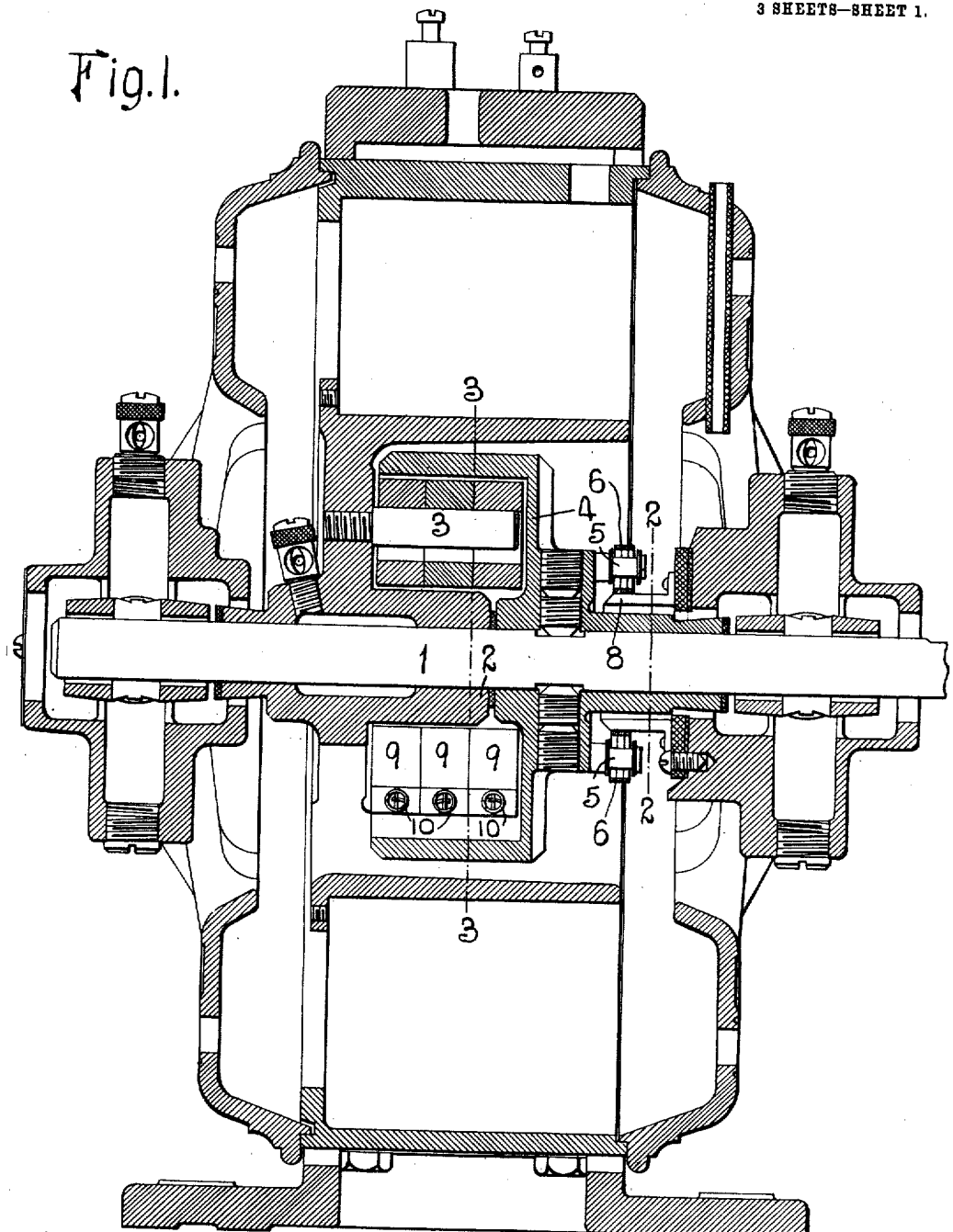
Figure 2:
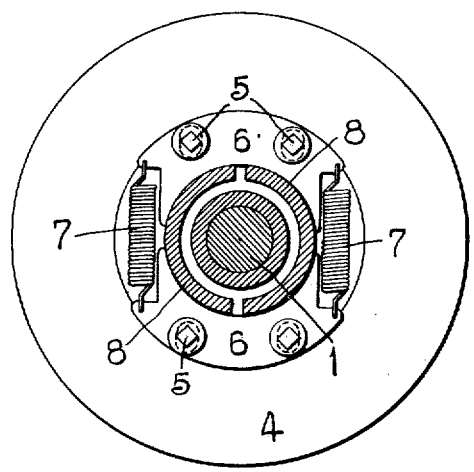
Figure 3:
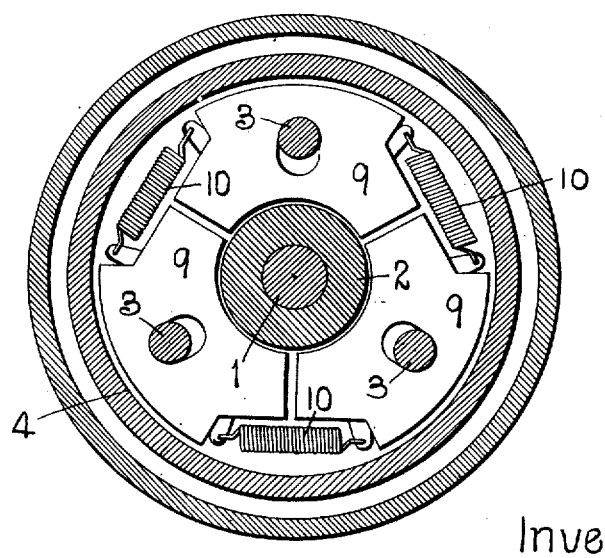

Figure 1 is a vertical longitudinal sectional view. Fig. 2 is a vertical cross-sectional view on the line 2 2 of Fig. 1. Fig. 3 is a vertical cross-sectional view on the line 3 3 of Fig. 1; and Fig. 4 is a diagrammatic view showing the field-winding, including the starting-coils and their connections to the controller-terminals.

This invention relates to a new and useful improvement in electric motors, particularly alternating-current motors, wherein there are employed starting-coils through which the current is directed when the motor is started, said coils when the motor attains speed being automatically cut out. When the armature attains speed, said armature automatically throws into operative position a clutch mechanism whereby the armature becomes coupled to the shaft.

The object of our invention is to provide a motor having a simple form of mechanism for automatically coupling the armature to its shaft and cutting out the starting-coils. By our improved construction the armature revolves freely on its shaft in attaining speed, and when the desired speed is attained the starting-coils are cut out and the clutch devices thrown into operative position, whereby the motor runs as an induction-motor, and in addition to which the armature is coupled to the shaft by friction devices, whereby if the load is too heavy the coupling will permit independent rotation of the armature.

Figure 4:
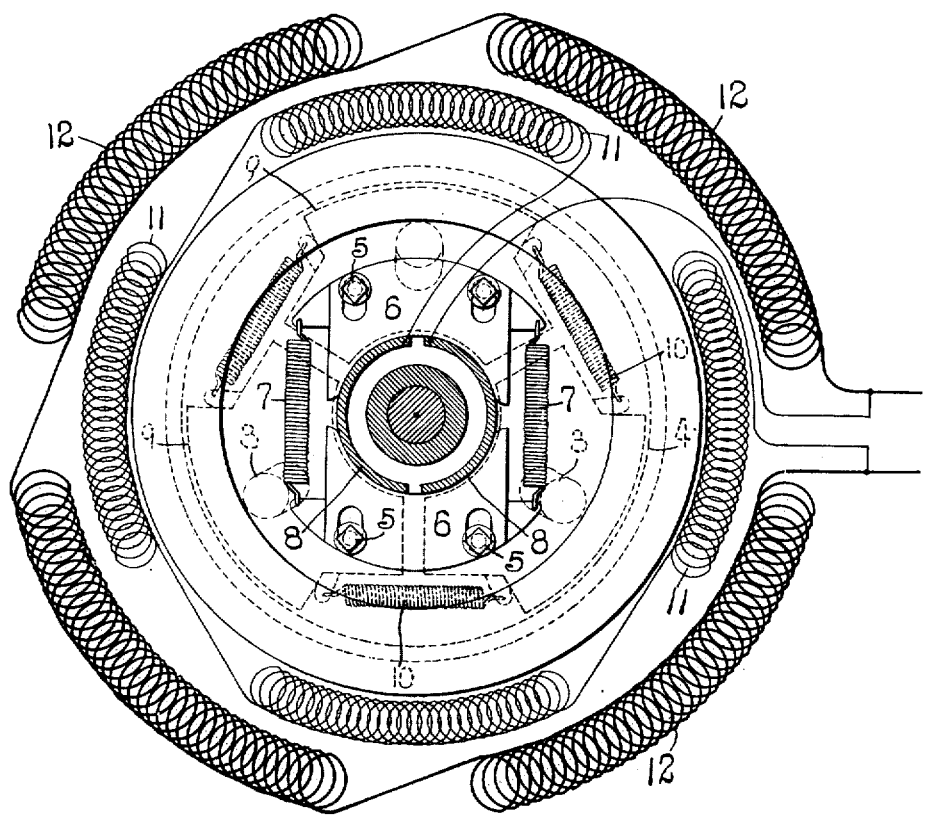

In Fig. 1 of the accompanying drawings is shown the framework of an alternating-current motor, having omitted the windings of the field and the details of the armature, the field-winding being shown diagrammatically in Fig. 4.

In the drawings, 1 indicates the armature-shaft, mounted in suitable bearings in the frame of the motor, and 2 the armature-hub, which armature-hub carries pins or projections 3, there being preferably three of said projections mounted on the armature-hub, said armature-hub being mounted so as to freely rotate on the shaft 1.

4 is a clutch member in the form of a flanged disk, which is fixed to the shaft 1. This clutch member carries pins 5, which pass through elongated slots in contact-plates 6. (See Fig. 2.) There are two of these contact-plates, oppositely disposed with respect to each other, their ends being connected by springs 7, which springs tend to hold said plates on the divided contact-ring 8. The two segments of ring 8 are connected in series with the starting-coils 11 of the motor, and the opening between said segments constitutes a break in the continuity of this circuit, which break is closed or completed by the contact-plates 6.

12 indicates the main field-coils, the terminals of which are connected to the starting-coils, as shown in Fig. 4.

Referring now to Fig. 3, it will be observed that the pins 3 pass through radial slots in a plurality of sets of weighted clutch members 9, connected together by springs 10.

In operation when current is admitted to the motor the plates 6 are in contact with the segments 8 of the divided contact-ring, completing the circuit through the starting-coils, causing them to be energized, and thus considerable torque is developed in the motor, so as to cause the armature to rotate. It will be observed that the starting-coils are cut in by the plates 6 as long as the shaft 1 and its friction-disk 4 remain stationary. When the armature attains such speed that centrifugal force will throw the friction-weights 9 outwardly against the flange of disk 4, it is manifest that the disk 4 will be rotated, and with it the shaft 1, providing, of course, that the load on shaft 1 will permit of such rotation. If the load on shaft 1 is too heavy, the weighted friction devices 9 will slip on the flange of disk 4. Rotation being imparted to the disk 4, the pins 5 thereof will cause the plates 6 to be rotated, and as the springs 7 are so adjusted as to permit these plates 6 to be thrown outwardly by centrifugal force out of contact with the segments 8 it will be obvious that the starting-coils will thus be automatically cut out when the motor attains speed, permitting the motor to run at its designed high speed in a more economical and efficient manner.

We are aware that minor changes in the construction, arrangement, and combination of the several parts of our device can be made and substituted for those herein shown and described without in the least departing from the nature and principle of our invention.

Having thus described the invention, what is claimed as new, and desired to be secured by Letters Patent, is—

1. In an electric motor, the combination with an armature-shaft, an armature loosely mounted on said shaft, devices mounted on said armature constituting driving elements of a clutch, a companion clutch member fixed to the armature-shaft, and contact-making devices carried by the armature-shaft, said contact-making devices being in an operative position when said armature-shaft is stationary; substantially as described.

2. In an electric motor, the combination with an armature-shaft, of an armature loosely mounted thereon, centrifugally-operated clutch members operatively connected to said armature, a companion clutch member fixedly mounted on the armature-shaft, contact-making plates mounted on said armature-shaft, which contact-making plates occupy an operative position when the armature-shaft is stationary, and means for rendering said contact-making plates inoperative when the armature is rotated; substantially as described.

3. In an electric motor, the combination with an armature-shaft, an armature loosely mounted thereon, centrifugally - operated friction clutch devices rotatably carried by said armature, a companion clutch member fixedly mounted on the armature - shaft, and centrifugally-operated contact-making plates which, when the armature-shaft is stationary, complete the circuit through the starting-coils of the motor, and, when the armature-shaft is rotated, said plates are moved to an inoperative position so as to cut out said starting-coils; substantially as described.

4. In an electric motor, the combination with an armature-shaft, an armature loosely mounted on said shaft, a set of radially-moving plates carried by the armature and constituting the driving element of the clutch, a companion clutch member fixed to the armature-shaft, and contact-making devices carried by the armature-shaft, said contact-making devices being in an operative position when said armature-shaft is stationary; substantially as described.

5. In an electric motor, the combination with an armature-shaft, an armature loosely mounted on said shaft, a set of radially-moving plates provided with elongated slots which receive pins carried by the armature, said plates constituting the driving element of a clutch, a companion clutch member fixed to the armature-shaft, and contact-making devices carried by the armature-shaft, said contact-making devices being in an operative position when said armature-shaft is stationary; substantially as described.

6. In an electric motor, the combination with an armature-shaft, an armature loosely mounted on said shaft, a set of radially-moving plates carried by the armature and constituting the driving element of a clutch, yielding means for holding said plates normally in an inoperative position, a companion clutch member fixed to the armature-shaft, and contact-making devices carried by the armature-shaft, said contact-making devices being in an operative position when said armature-shaft is stationary; substantially as described.

7. In an electric motor, the combination with an armature-shaft, an armature loosely mounted on said shaft and provided with a plurality of pins, a radially-movable plate mounted on each pin, said plates coöperating to form the driving element of a clutch, a companion clutch member fixed to the armature-shaft, and contact-making devices carried by the armature-shaft, said contact-making devices being in an operative position when said armature-shaft is stationary; substantially as described.

8. In an electric motor, the combination with an armature-shaft, an armature loosely mounted on said shaft, a plurality of radially-moving plates carried by the armature and constituting the driving element of a clutch, a companion clutch member fixed to the armature-shaft, and contact-making devices carried by the armature-shaft, said contact-making devices being in an operative position when said armature-shaft is stationary; substantially as described.

9. In an electric motor, the combination with an armature-shaft, an armature loosely mounted on said shaft, a set of radially-moving plates carried by the armature and constituting the driving element of a clutch, a companion clutch member fixedly mounted on the armature-shaft, radially-moving contact-making plates mounted on said armature-shaft, which contact-making plates occupy an operative position when the armature-shaft is stationary and which are adapted to be rendered inoperative when the armature-shaft is rotated; substantially as described.

10. In an electric motor, the combination with an armature-shaft, an armature loosely mounted on said shaft, a set of radially-moving plates carried by the armature and constituting the driving element of a clutch, a companion clutch member fixedly mounted on the armature-shaft, radially-moving contact-making plates mounted on said armature-shaft, and yielding means for holding said contact-making plates in an operative position when the armature is stationary, said plates being adapted to move into an inoperative position when the armature is rotated; substantially as described.

11. In an electric motor, the combination with an armature-shaft, an armature loosely mounted on said shaft, a set of radially-moving plates carried by the armature and constituting the driving element of a clutch, a companion clutch member fixedly mounted on the armature-shaft, pins carried by said companion clutch member, sets of contact-making plates provided with elongated slots through which said pins extend, and yielding means for holding said contact-making plates in an operative position when the armature-shaft is stationary, said plates being adapted to move into an inoperative position when the armature is rotated; substantially as described.

In testimony whereof we hereunto affix our signatures, in the presence of two witnesses, this 9th day of April, 1906.

CHARLES R. MESTON.
HERBERT I. FINCH.

Witnesses:
F. R. CORNWALL,
GEORGE BAKEWELL.